Nov. 3, 1959 — T. W. BIAS — 2,910,798
FISHING BOBBER WITH BAIT GUARD
Filed Oct. 31, 1958

INVENTOR
Thomas W. Bias
BY Mason, Fenwick & Lawrence
ATTORNEYS

2,910,798
FISHING BOBBER WITH BAIT GUARD

Thomas W. Bias, North Kenova, Ohio

Application October 31, 1958, Serial No. 771,081

2 Claims. (Cl. 43—41.2)

This invention relates to fishing bobbers, and more particularly to fishing bobbers having incorporated therewith a bait guard.

Bait guards, or as they are more popularly known, bait cups, are used by fishermen for casting bait to a distant point either by hand line or a fishing pole. Bait cups of the type previously used consist of a cup in which the baited hook and sinker is placed so that the bait may be protected during the cast, and also protect it from impact when it hits the water. One end of the bait cup is provided with a bobber-like float so that the bait cup will float with its open end downward and the bait and sinker will fall from the cup by gravity.

Fishermen have experienced a great deal of difficulty in the use of known types of bait cups. Much of this difficulty stems from the flight of the bait cup when it is cast. Many of the known bait cups are provided with a bobber portion having a central bore through which the fishing line freely passes. The bait and sinker are then attached to the line. When such a bait cup is cast, the open end of the cup is the leading end of the device. Wind pressure acting on the open end of the cup will cause the bait cup to move back along the line, and the bait will not be protected when it hits the water. Attempts have been made to solve this problem by fastening the fishing line at the open end of the cup, so that the line will hold the cup with its open end rearward of its travel. In bait cups of this type the flight of the cup is erratic; the successful casting distance is short. Also, the wobbly course of the bait cup frequently causes the bait and sinker to be thrown from the cup and become entangled with the fishing line on the opposite side of the bait cup.

Also, many fishing grounds present a variety of conditions, and very often it may be desirable to use a bait cup at one place and simply a bobber at another. Although known types of bait cups have a built-in float; the float is not usable as a bobber apart from the bait cup, making it necessary for a fisherman to encumber his tackle box with both a bobber and a bait cup.

Consequently, it is an object of the present invention to provide a bait cup having an aerodynamic shape, to insure that its flight will at all times be free of wobble, and that the float portion of the bait cup will be foremost during the cast.

It is a further object of the present invention to provide a float for said bait cup, in which the float has a means for detachably fastening it to the cup portion of said bait cup which does not interfere with its use as a fishing bobber.

Other objects and advantages of the present invention will become apparent to those skilled in the art from the following description when read in conjunction with the accompanying drawing, wherein.

Figure 2:
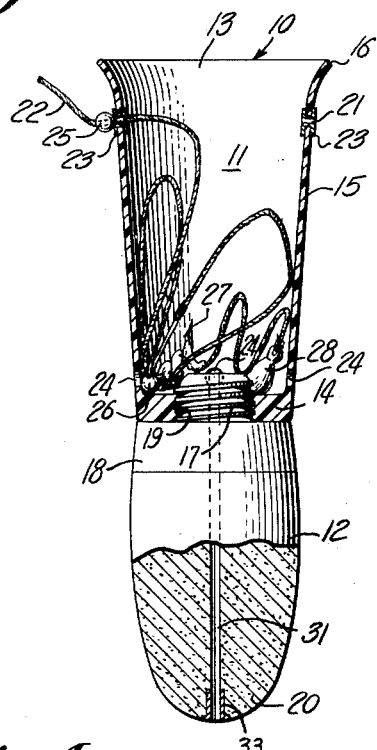
Figure 2 is a longitudinal sectional view of the bait cup taken on the line 2—2 of Figure 1, showing the bait and sinker in the cup ready for casting.

Adverting now to the drawing, and more particularly to Figure 2, the bait cup 10 of the present invention comprises a cup portion 11, and a float portion 12. The cup portion 11 is made of light weight thin walled material, such as for example one of the synthetic resin plastics. The material of which it is made, of course, should be resistant to the action of sea water. The cup portion 11 has an open end 13, a base 14, and a wall 15. The wall 15 is outwardly tapered from the base 14 to an outwardly flaring lip 16. Since it is desirable that the cup portion 11 trails the float portion 12 during the flight of the bait cup when it is cast, the outward taper of the side 15 and outward flaring of the lip 16 acts during flight as a braking means at the back of the unit, to hold it on a straight course in a manner similar to the feather on an arrow, or the tail fin of a rocket.

The float portion 12 has sufficient buoyancy to float high in the water and support the lightweight cup portion. It may be made of any suitable buoyant material, such as for example from a piece of wood.

The float portion 12 is removably joined to the cup portion 11 by means of a threaded stud 17 axially mounted on the rearward end 18 of the float portion 12, which is received in a threaded aperture 19 centrally disposed in the base 14 of the cup portion 11. The float portion 12 is cylindrical in cross-section, and has a rounded cone shape, as seen in the figure which tapers toward a blunt nose 20. A plurality of circumferentially spaced apertures 21 are provided near the lip 16, primarily so that one of them may be used to receive the fishing line 22. A reinforcement 23, such as an eyelet, is provided for each of the apertures 21 as a precaution against possible tearing of the wall 15 when a fish strikes the line. The reinforcement 23 has an aperture of adequate size, so that the fishing line 22 may freely pass through it. A plurality of vents 24 are circumferentially spaced about the other end of the cup portion adjacent the bottom 14. The purpose of the vents 24 and the unused apertures 21 is to insure a rapid displacement of the air from the cup portion by water, to obtain a quick sinking of the cup portion 11 when the bait cup 10 hits the water.

A limit bead 25 having an axial aperture only slightly larger than the fishing line 22 is threaded on the line and passed through the reinforced aperture 21 from outside of the cup portion to the inside. A stop bead 26 having an axial aperture similar to that of the limit bead 25 is then threaded on the line, and the leader of hook 27 and sinker 28 are attached to the line by tying a knot 29 in well-known manner. The knot 29 will not pass through the aperture of the stop bead 26 and the stop bead 26 will not pass through the aperture 21, and therefore, prevents drawing of the hook leader and sinker line through the aperture 21.

Figure 1:
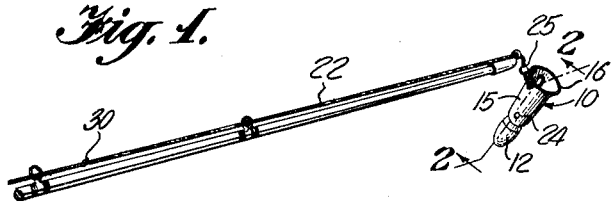
Figure 1 is a perspective view of the bait cup of the present invention, attached to the line of a fishing pole in position for casting.
Figure 3:
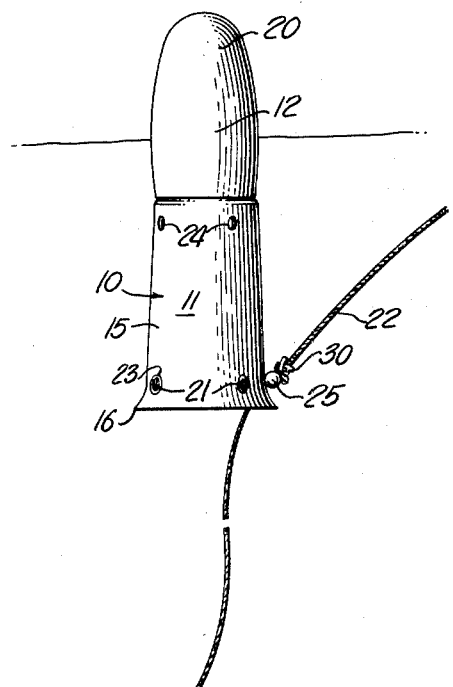
Figure 3 is a perspective view of the bait cup of the present invention floating in the water, the bait and sinker having fallen from the cup into fishing position, and with the line stop in place to limit the fishing depth.

In use with a fishing pole, the bait guard 10 is drawn up to the end of the pole with the sinker and bait disposed within the cup, as shown in Figures 1 and 2. When the bait cup is cast, it turns as it is cast, the float 12 being forwardmost during the entire flight, due to the lip 16 which acts as a cylindrical vane to keep the bait cup on a straight soaring course. When the bait cup hits the water, the weight of the sinker causes it to tilt downward and water which may first flow into the cup portion through the apertures 21 will displace the air which escapes through the vents 24. The baited hook and sinker will fall by gravity from the cup portion. A rubber band 30 may be releasably tied to the fishing line 22 on the pole side of the limit bead 25, to limit the depth to which the bait will sink. The knot formed by tying the rubber band on the fishing line will not pass through the aperture of the limit bead 25, and the limit bead 25 is of such size that it will not pass through the aperture 21 in the wall 15 of the cup portion 11. The bait and sinker will, therefore, be suspended from a point near the edge of the cup portion 11, and the bait cup will float with the float portion 12 in uppermost position to serve as a bobber. When a strike occurs, it will be signaled by the action of the bobber. As seen in Figure 3, the full force of the strike is not transmitted through the bait cup, as it would be if the line from the fishing pole were fixedly attached to one side of the bait cup and the line to the fishhook were fixedly attached to the other side of the bait cup.

Figure 4:
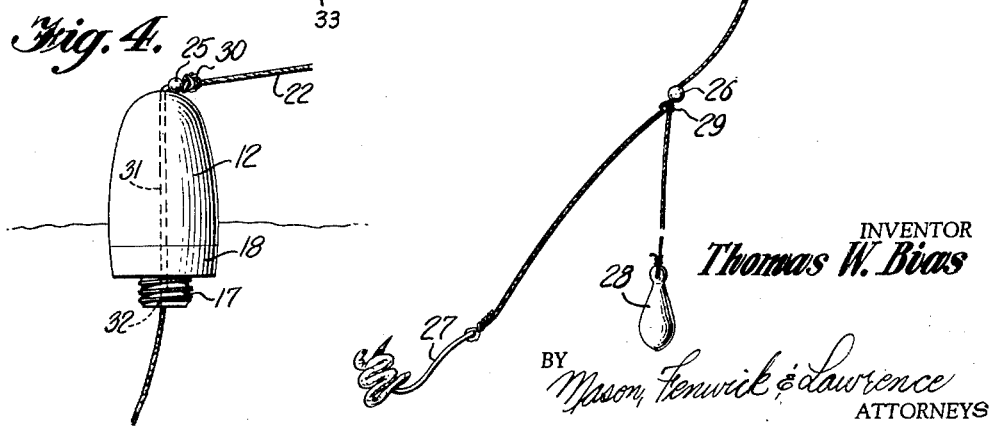
Figure 4 is a side elevation of the float portion of the bait cup detached from the cup portion of said bait cup for use as a fishing bobber.

As shown in Figure 4, the float portion 12 may be unscrewed from the cup portion 11 and used as a bobber. For this purpose, the float portion 12 is provided with an axial bore 31 and the stud 17 is also provided with a similar bore 32 in alignment with the bore 31. The forward end of the bore 31 may be protected by means of a hollow rivet-like insert 33 to prevent wearing away of the wood, or wood composition material, such as a mixture of wood or cork flour and synthetic resin plastic, of which the float portion 12 is made, by the fishing line. The stud 17 is preferably made of metal, so that when the float portion 12 is used as a bobber only, it will float upright in the water. As shown in Figure 4, the fishing line 22 is threaded through the limit bead 25 and thence through the bores 31 and 32 and stop bead 26 in a manner shown in Figure 2. The fishhook leader 27 and sinker 28 are then tied to the line, and the rubber band 30 is fixed to the line at a point corresponding to the desired fishing depth. The float portion 12 being used as a bobber may then be drawn up to the fishing pole and cast. When it hits the water it will float in an upright position, due to the weight of the stud 17, and the bait will sink until the limit bead 25 engages the insert 33, at which level the bait will be held suspended from the bobber.

This invention has been illustrated with respect to being cast with a fishing pole. However, it will readily be seen that it may be equally as well used for hand casting. Either the bait cup 10 or the float portion 12 being used as a bobber may be swung about the head of the user and cast with comparable results.

While there has been disclosed in the foregoing description a practical embodiment of the fishing bobber with a bait guard in accordance with the present invention, it will be understood by those skilled in the art that variations in the implementation of the concept of the invention are within the purview and scope of the invention.

What is claimed is:

1. A fishing bobber with bait guard for casting comprising, a float portion having a streamlined nose and a base, a cup portion having an open end and a base, means for detachably mounting said base of said cup-portion in aligned superposed position on said base of said float portion, said cup portion having a plurality of vents disposed in its side wall adjacent its said base, said float portion having an axial bore in communication with said cup portion, said cup portion having at least one aperture adjacent its open end to freely receive a fishing line therethrough, and air vane means adjacent the open end of said cup portion so that said fishing bobber and bait guard will assume and maintain its float portion in forwardmost position during its casting flight.

2. A fishing bobber with bait guard for casting comprising, a float portion having a streamlined nose and a base, a cup portion having an open end and a base, means for detachably mounting said base of said cup portion in aligned superposed position on said base of said float portion, said cup portion having a plurality of vents disposed in its side wall adjacent its said base, said float portion having an axial bore in communication with said cup portion, said cup portion having at least one aperture adjacent its open end to freely receive a fishing line therethrough, and an outwardly flaring lip disposed about the open end of said cup portion, said lip having a diameter greater than said float portion so that said fishing bobber and bait guard will assume and maintain its float portion in forwardmost position during its casting flight.

References Cited in the file of this patent

UNITED STATES PATENTS

| | | |
|---|---|---|
| 1,128,205 | White | Feb. 9, 1915 |
| 2,292,743 | Cordry | Aug. 11, 1942 |
| 2,607,152 | Zubiak et al. | Aug. 19, 1952 |
| 2,629,198 | Johnston | Feb. 24, 1953 |
| 2,768,464 | Volz | Oct. 30, 1956 |